US010435495B2

(12) United States Patent
Jang et al.

(10) Patent No.: US 10,435,495 B2
(45) Date of Patent: *Oct. 8, 2019

(54) COPOLYMERS AND THERMOPLASTIC RESIN COMPOSITION COMPRISING THE SAME

(71) Applicant: Lotte Advanced Materials Co., Ltd., Yeosu-si (KR)

(72) Inventors: Joo Hyun Jang, Uiwang-si (KR); Jae Won Heo, Uiwang-si (KR); Bo Eun Kim, Uiwang-si (KR); Kwang Soo Park, Uiwang-si (KR); Yu Jin Jung, Uiwang-si (KR); Ki Bo Chang, Uiwang-si (KR); Young Sub Jin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 614 days.

This patent is subject to a terminal disclaimer.

(21) Appl. No.: 14/747,249

(22) Filed: Jun. 23, 2015

(65) Prior Publication Data

US 2015/0376314 A1 Dec. 31, 2015

(30) Foreign Application Priority Data

Jun. 27, 2014 (KR) .................. 10-2014-0080224
Oct. 17, 2014 (KR) .................. 10-2014-0140605

(51) Int. Cl.
*C08F 212/10* (2006.01)
*C08F 222/30* (2006.01)
*C08F 230/08* (2006.01)
*C08L 25/12* (2006.01)
*C08F 222/32* (2006.01)
*C08F 222/34* (2006.01)

(52) U.S. Cl.
CPC .......... *C08F 212/10* (2013.01); *C08F 222/30* (2013.01); *C08F 230/08* (2013.01); *C08L 25/12* (2013.01); *C08F 222/32* (2013.01); *C08F 222/34* (2013.01); *C08L 2205/025* (2013.01); *C08L 2205/03* (2013.01)

(58) Field of Classification Search
CPC ............ C08F 212/10; C08F 222/30–34; C08F 220/40; C08F 230/08; C08F 2230/085
See application file for complete search history.

(56) References Cited

U.S. PATENT DOCUMENTS

| | | |
|---|---|---|
| 4,438,280 A | 3/1984 | Monacelli |
| 4,460,742 A | 7/1984 | Kishida et al. |
| 4,659,790 A | 4/1987 | Shimozato et al. |
| 4,757,109 A | 7/1988 | Kishida et al. |
| 5,106,908 A * | 4/1992 | Alsmarraie ......... C08F 283/126 525/100 |
| 6,599,978 B1 | 7/2003 | Shikisai et al. |
| 8,507,623 B2 | 8/2013 | Sohn et al. |
| 8,557,912 B2 | 10/2013 | Chung et al. |
| 8,735,490 B2 | 5/2014 | Chung et al. |
| 9,522,994 B2 * | 12/2016 | Kim ............ C08L 25/12 |
| 2004/0102579 A1 | 5/2004 | Su |
| 2005/0096431 A1 * | 5/2005 | Fujii ............ C08J 5/18 525/178 |
| 2010/0240851 A1 * | 9/2010 | Sohn ............ C08F 212/12 526/262 |

FOREIGN PATENT DOCUMENTS

| | | |
|---|---|---|
| CN | 1301273 A | 6/2001 |
| CN | 101081886 A | 12/2007 |
| CN | 101711261 A | 5/2010 |
| CN | 102115564 A | 7/2011 |
| CN | 102329462 A | 1/2012 |
| GB | 2010866 B | 6/1979 |
| KR | 10-2011-0079489 A | 7/2011 |
| KR | 20110079489 A * | 7/2011 |
| KR | 10-2013-0076616 A | 7/2013 |

OTHER PUBLICATIONS

Office Action in commonly owned U.S. Appl. No. 14/750,006 dated Apr. 11, 2016, pp. 1-8.
Notice of Allowance in commonly owned U.S. Appl. No. 14/750,006 dated Aug. 12, 2016, pp. 1-6.

* cited by examiner

Primary Examiner — Ling Siu Choi
Assistant Examiner — David L Miller
(74) Attorney, Agent, or Firm — Additon, Higgins & Pendleton, P.A.

(57) ABSTRACT

A copolymer includes (A) an aromatic vinyl-based monomer, (B) an unsaturated nitrile-based monomer, (C) a crosslinkable siloxane compound, and (D) an N-substituted maleimide-based monomer to realize a synergistic effect of matting characteristics and heat resistance properties. A thermoplastic resin composition including the copolymer, and a molded article including the thermoplastic resin composition are provided.

15 Claims, 1 Drawing Sheet

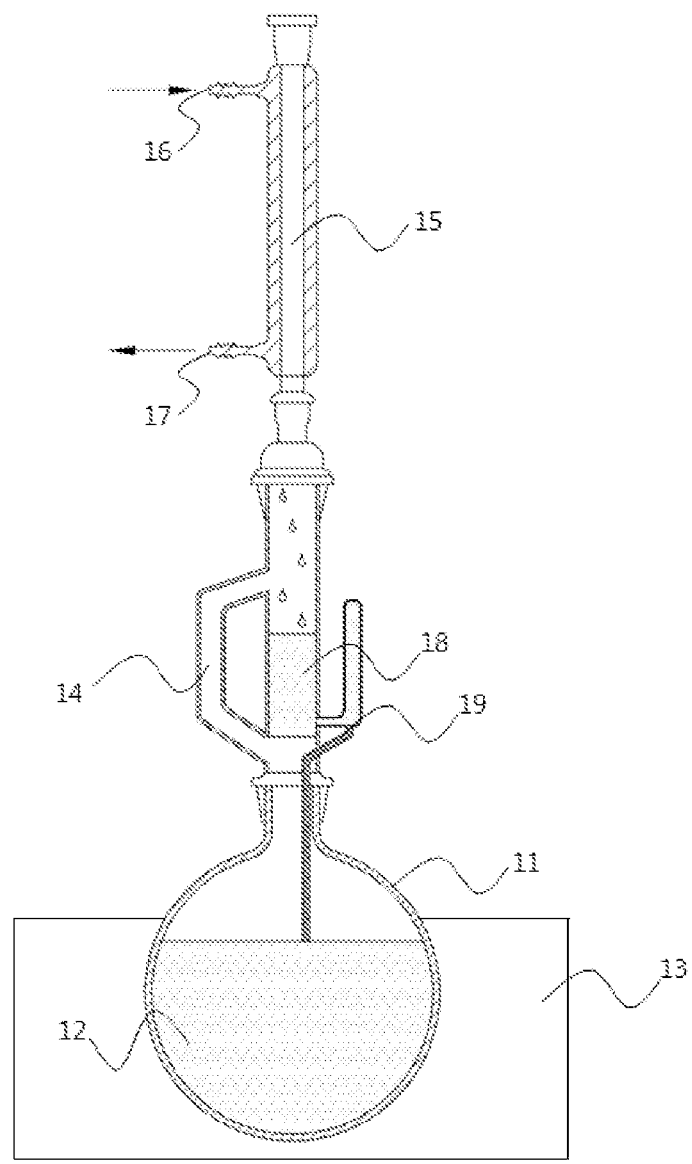

COPOLYMERS AND THERMOPLASTIC RESIN COMPOSITION COMPRISING THE SAME

CROSS-REFERENCE TO RELATED APPLICATION

This application claims priority under 35 USC Section 119 to and the benefit of Korean Patent Application Nos. 10-2014-0080224, filed on Jun. 27, 2014, and 10-2014-0140605, filed on Oct. 17, 2014, in the Korean Intellectual Property Office, the entire disclosure of each of which are incorporated herein by reference.

FIELD OF THE INVENTION

The present invention relates to a copolymer, and a thermoplastic resin composition including the same.

BACKGROUND

Thermoplastic resins have lower specific gravity than glass or metals, and also can have excellent mechanical properties such as moldability, impact resistance, and the like. Plastic products prepared using such thermoplastic resins have rapidly replaced glass and metals in various fields including electric and electronic products, automobile parts, etc.

In recent years, there has been an increasing demand for products having a low gloss appearance. Gloss-less paint has been applied to the surface of plastic products to provide a low gloss surface. There are, however, environmental concerns associated with the same. Accordingly, there has been an increased demand for low-gloss resins.

To realize a low-gloss effect without using a gloss-less paint, a method of realizing a low-gloss effect by adjusting surface smoothness of a resin in a wavelength range greater than a visible-ray region to scatter incident light has been widely used. For example, there are methods using a large-sized rubbery polymer or using a matting agent as an additive. However, such methods can have problems, such as poor low-gloss effect or degraded heat resistance and impact resistance. As another method, a method of graft-polymerizing a monomer such as ethylene-unsaturated carboxylic acid into a resin has been used. This method can provide various good physical properties, but can also rapidly degrade heat resistance.

U.S. Pat. No. 4,460,742 discloses a low-gloss resin composition in which a cross-linked copolymer is used. Such a resin composition has a matte appearance when large-sized rubber particles or a matting agent is added. However, the resin composition can require an excessive amount of the matting agent, which can degrade impact strength and temperature resistance.

SUMMARY

Exemplary embodiments provide a copolymer capable of realizing excellent high heat resistance and/or matting characteristics.

Exemplary embodiments also provide a thermoplastic resin composition including the copolymer, and a molded article prepared using the same.

To solve the problems of the prior art, the copolymer according to one exemplary embodiment of the present invention is prepared by copolymerizing (A) an aromatic vinyl-based monomer, (B) an unsaturated nitrile-based monomer, (C) a cross-linkable siloxane compound, and (D) an N-substituted maleimide-based monomer.

The copolymer according to one exemplary embodiment of the present invention may be prepared from a mixture including (A) the aromatic vinyl-based monomer in an amount of about 50 to about 80% by weight, (B) the unsaturated nitrile-based monomer in an amount of about 15 to about 40% by weight, (C) the cross-linkable siloxane compound in an amount of about 0.1 to about 10% by weight, and (D) the N-substituted maleimide-based monomer in an amount of about 1 to about 20% by weight, each based on the total weight (100% by weight) of the monomers used to prepare the copolymer.

In the copolymer according to one exemplary embodiment of the present invention, a mixed weight ratio of (C) the cross-linkable siloxane compound and (D) the N-substituted maleimide-based monomer maybe in a range of about 1:0.3 to about 1:3.

In the copolymer according to one exemplary embodiment of the present invention, (C) the cross-linkable siloxane compound may be represented by the following Formula 1.

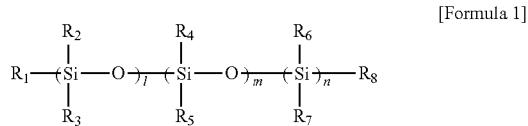

[Formula 1]

In Formula 1, l, m and n are the same or different and each is independently an integer ranging from 0 to 100 (provided that l, m and n are not zero at the same time), and $R_1$, $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$, $R_2$, $R_3$, $R_4$, $R_5$, $R_6$, $R_7$, and $R_8$ include a polymerizable unsaturated reactive group.

In the copolymer of one exemplary embodiment of the present invention, (C) the cross-linkable siloxane compound may be represented by the following Formula 2.

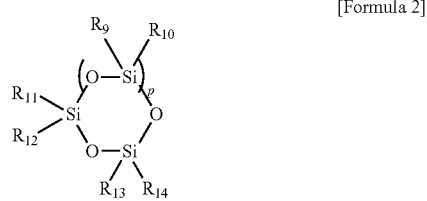

[Formula 2]

In Formula 2, $R_9$, $R_{10}$, $R_{11}$, $R_{12}$, $R_{13}$ and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$, $R_{10}$, $R_{11}$, $R_{12}$, $R_{13}$, and $R_{14}$ include a polymerizable unsaturated reactive group.

In the copolymer according to one exemplary embodiment of the present invention, the cross-linkable siloxane compound may include at least one selected from the group consisting of 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and mixtures thereof.

In the copolymer according to one exemplary embodiment of the present invention, the cross-linkable siloxane compound may have a weight average molecular weight of about 150 to about 6,000 g/mol.

In the copolymer according to one exemplary embodiment of the present invention, (A) the aromatic vinyl-based monomer may include at least one selected from the group consisting of styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and mixtures thereof.

In the copolymer according to one exemplary embodiment of the present invention, (B) the unsaturated nitrile-based monomer may include at least one selected from the group consisting of acrylonitrile, methacrylonitrile, ethacrylonitrile, phenylacrylonitrile, α-chloroacrylonitrile, fumaronitrile, and mixtures thereof.

In the copolymer according to one exemplary embodiment of the present invention, (D) the N-substituted maleimide-based monomer may include at least one selected from the group consisting of N-phenylmaleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, N-benzylmaleimide, and mixtures thereof.

The copolymer according to one exemplary embodiment of the present invention may be prepared from a mixture including at least one multifunctional vinyl-based compound selected from the group consisting of divinylbenzene, ethylene glycol di(meth)acrylate, allyl(meth)acrylate, diallylphthalate, diallylmalate, triallylisocyanurate, and mixtures thereof.

The copolymer according to one exemplary embodiment of the present invention may be cross-linked.

The copolymer according to one exemplary embodiment of the present invention may have a glass transition temperature ($T_g$) of about 95 to about 115° C.

The present invention may provide a thermoplastic resin composition including the copolymer.

The thermoplastic resin composition according to one exemplary embodiment of the present invention may include at least one selected from the group consisting of a styrene-acrylonitrile copolymer (SAN) resin composition, a methyl methacrylate-styrene-acrylonitrile copolymer (MSAN) resin composition, an acrylonitrile-butadiene-styrene copolymer (ABS) resin composition, a methyl methacrylate-acrylonitrile-butadiene-styrene copolymer (MABS) resin composition, an acrylonitrile-styrene-acrylate copolymer (ASA) resin composition, a polycarbonate (PC)/acrylonitrile-butadiene-styrene copolymer (ABS) alloy resin composition, a polycarbonate (PC)/acrylonitrile-styrene-acrylate copolymer (ASA) alloy resin composition, a polymethyl methacrylate (PMMA)/acrylonitrile-butadiene-styrene copolymer (ABS) alloy resin composition, a polymethyl methacrylate (PMMA)/methyl methacrylate-acrylonitrile-butadiene-styrene copolymer (MABS) alloy resin composition, a polymethyl methacrylate (PMMA)/acrylonitrile-styrene-acrylate copolymer (ASA) alloy resin composition, and mixtures thereof.

Also, the present invention may provide a molded article including the thermoplastic resin composition.

The molded article according to one exemplary embodiment of the present invention may have a gloss of about 32% or less, as measured at an angle of 60° by an evaluation method according to ASTM D523, and may have a Vicat softening temperature (VST) of about 101 to about 110° C., as measured for a ¼ inch-thick specimen under conditions of a load of 5 kg and a rate of 50° C./hr by an evaluation method according to ISO 306B50.

BRIEF DESCRIPTION OF DRAWINGS

FIG. 1 is a diagram showing a Soxhlet extraction reactor used to measure cross-linking of a silicon-modified aromatic vinyl-based copolymer according to one exemplary embodiment of the present invention.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, an aromatic vinyl copolymer capable of realizing excellent high heat resistance and matting characteristics at the same time according to exemplary embodiments of the present invention will be described in detail. Exemplary embodiments disclosed herein are provided as examples for the purpose of sufficiently providing the scope of the present invention to those skilled in the related art. Also, unless specifically stated otherwise, all the technical and scientific terms used in this specification have the same meanings as what are generally understood by a person skilled in the related art to which the present invention belongs. In the following description, detailed descriptions of well-known functions or constructions will be omitted since they would obscure the invention in unnecessary detail.

In the present invention, the weight average molecular weight (units: g/mol) of a powder sample is measured using gel permeation chromatography (GPC; Agilent Technologies 1200 series) after the sample is dissolved in tetrahydrofuran (THF). In this case, Shodex LF-804 (8.0.1.D.×300 mm) and polystyrene (Shodex Co. Ltd.) are used as a column and a standard sample, respectively.

The present inventors have conducted research on aromatic vinyl copolymers capable of realizing uniform matting characteristics and high heat resistance properties at the same time without degrading various physical properties such as impact resistance in order to improve a decrease in temperature resistance of conventional low-gloss resins including large-sized rubber particles, a matting agent, or a silicon-based compound, and surprisingly found that a copolymer prepared by copolymerizing a mixture of monomers including a cross-linking agent including two or more unsaturated reactive groups and a monomer having excellent heat resistance may realize both uniform matting characteristics and high heat resistance properties with minimal or no degradation of various physical properties. Therefore, the present invention has been completed based on these facts.

The copolymer according to one exemplary embodiment of the present invention may be prepared by copolymerizing a mixture of monomers including (A) an aromatic vinyl-based monomer, (B) an unsaturated nitrile-based compound, (C) a cross-linkable siloxane compound, and (D) an N-substituted maleimide-based monomer.

Hereinafter, the respective components will be described in further detail.

(A) Aromatic Vinyl-Based Monomer

Examples of the aromatic vinyl-based monomer that may be used herein may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like, and mixtures thereof.

In exemplary embodiments, the aromatic vinyl-based monomer that may be used herein may include styrene, α-methylstyrene, and/or a mixture thereof.

In exemplary embodiments, the aromatic vinyl-based monomer may be included in an amount of about 50 to about 80% by weight, based on the total weight (100% by weight) of the mixture of monomers used to prepare the copolymer. In some embodiments, the aromatic vinyl-based monomer may be included in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight, based on the total weight of the mixture of monomers. Further, according to some embodiments, the amount of the aromatic vinyl-based monomer can be in a range from about any of the foregoing amounts to about any other of the foregoing amounts. Within this content range, impact resistance strength and/or heat resistance of the thermoplastic resin composition may be improved.

(B) Unsaturated Nitrile-Based Monomer

Examples of the unsaturated nitrile-based monomer that may be used herein may include without limitation acrylonitrile, methacrylonitrile, ethacrylonitrile, phenylacrylonitrile, α-chloroacrylonitrile, fumaronitrile, and the like, and mixtures thereof.

In exemplary embodiments, the unsaturated nitrile-based monomer may include acrylonitrile.

In exemplary embodiments, the unsaturated nitrile-based monomer may be included in an amount of about 15 to about 40% by weight, based on the total weight (100% by weight) of the mixture of monomers used to prepare the copolymer. In some embodiments, the unsaturated nitrile-based monomer may be included in an amount of about 15, 16, 17, 18, 19, 20, 21, 22, 23, 24, 25, 26, 27, 28, 29, 30, 31, 32, 33, 34, 35, 36, 37, 38, 39, or 40% by weight, based on the total weight of the mixture of monomers. Further, according to some embodiments, the amount of the unsaturated nitrile-based monomer can be in a range from about any of the foregoing amounts to about any other of the foregoing amounts.

The mixture can include the aromatic vinyl-based monomer and the unsaturated nitrile-based monomer in a mixed weight ratio (aromatic vinyl-based monomer:unsaturated nitrile-based monomer) of about 7:3 to about 9:1. When this mixed weight ratio range is satisfied, the unsaturated nitrile-based monomer may be combined with other components to improve matting characteristics with minimal or no degradation of mechanical properties and/or molding processability of the thermoplastic resin composition.

(C) Cross-linkable Siloxane Compound

The cross-linkable siloxane compound according to one exemplary embodiment of the present invention may be used to realize excellent matting characteristics while maintaining the various physical properties such as impact resistance, heat resistance, etc.

The cross-linkable siloxane compound may include a compound or a mixture of two or more compounds represented by the following Formula 1:

[Formula 1]

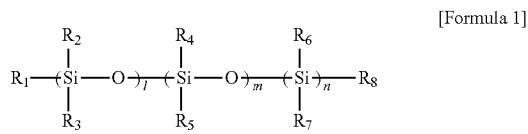

In Formula 1, l, m and n are the same or different and are each independently an integer ranging from 0 to 100 (provided that l, m and n are not zero at the same time), and $R_1$, $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$, $R_2$, $R_3$, $R_4$, $R_5$, $R_6$, $R_7$, and $R_8$ include a polymerizable unsaturated reactive group.

In the copolymer according to one exemplary embodiment of the present invention, the cross-linkable siloxane compound may be represented by the following Formula 2 when the cross-linkable siloxane compound has a ring-shape structure.

[Formula 2]

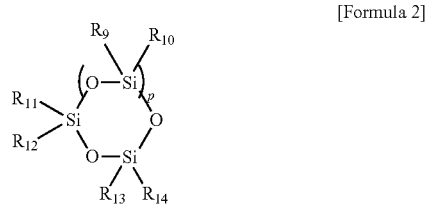

In Formula 2, $R_9$, $R_{10}$, $R_{11}$, $R_{12}$, $R_{13}$, and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$, $R_{10}$, $R_{11}$, $R_{12}$, $R_{13}$, and $R_{14}$ include a polymerizable unsaturated reactive group.

As used herein with reference to the compounds of Formula 1 and/or 2, the term "substituted" means that one or more hydrogen atoms are substituted with one or more substituents, such as but not limited to one or more of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof. As used herein, the term "hetero" refers to a nitrogen, sulfur, oxygen, and/or phosphorus atom in place of a carbon atom.

Examples of the cross-linkable monomer may include without limitation 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri-sec-butyl-1,3,5-trivinyl-cyclotrisiloxane, 1,3,5,7-tetra sec-butyl-1,3,5,7-tetravinyl-cyclotetrasiloxane, 1,3,5,7,9-penta-sec-butyl-1,3,5,7,9-pentavinyl-cyclopentasiloxane, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and the like, and mixtures thereof.

For example, the cross-linkable monomer that may be used herein may include at least one selected from the group consisting of 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and mixtures thereof. In exemplary embodiments, 1,3,5,7-tetramethyl-1,3,5,7-tetravinyl-cyclotetrasiloxane may be used.

In the present invention, the cross-linkable siloxane compound may be used alone or in combination to realize the various excellent physical properties such as impact resistance, heat resistance as well as matting characteristics which are difficult to achieve with conventional cross-linking agents, and to control a cross-linking degree and a polymerization reaction rate more easily than conventional cross-linking agents.

The cross-linkable siloxane compound may have a molecular weight or weight average molecular weight of about 150 to about 6,000 g/mol. When this molecular weight range is satisfied, a cross-linking degree may be easily controlled, and a cross-linking reaction may be smoothly performed to realize excellent matting characteristics. In some embodiments, the cross-linkable siloxane compound may have a weight average molecular weight of about 150, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4,000, 4100, 4200, 4300, 4400, 4500, 4600, 4700, 4800, 4900, 5000, 5100, 5200, 5300, 5400, 5500, 5600, 5700, 5800, 5900, or 6000 g/mol.

In the present invention, the cross-linkable siloxane compound may be included in an amount of about 0.1 to about 10% by weight, for example, about 1 to about 8% by weight, and as another example about 2 to about 5% by weight, based on the total weight (100% by weight) of the mixture of monomers used to prepare the copolymer. In some embodiments, the cross-linkable siloxane monomer may be included in an amount of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10% by weight, based on the total weight of the mixture of monomers used to prepare the copolymer. Further, according to some embodiments, the amount of the cross-linkable siloxane monomer can be in a range from about any of the foregoing amounts to about any other of the foregoing amounts.

When this content range is satisfied, a cross-linking degree of the copolymer may be easily controlled, matting characteristics may be improved with minimal or no degradation of impact resistance and/or heat resistance, and/or uniform matting characteristics may be generally realized.

(D) N-Substituted Maleimide-Based Monomer

In the present invention, the N-substituted maleimide-based monomer may be used to realize high heat resistance properties and/or a high heat deformation temperature of the prepared copolymer.

Examples of the N-substituted maleimide-based monomer that may be used herein may include without limitation N-phenylmaleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, N-benzylmaleimide, and the like, and mixtures thereof. In exemplary embodiments, the N-substituted maleimide-based monomer may include N-phenylmaleimide.

When the N-substituted maleimide-based monomer is directly added to a dispersing medium in a solid phase upon suspension polymerization, heat resistance and processability may be degraded and a conversion rate may decrease sharply due to difficulty in uniform polymerization. Therefore, the N-substituted maleimide-based monomer may be dissolved in an amount of about 2 to about 40% by weight based on the total weight of the unsaturated nitrile-based monomer to participate in polymerization. Also, the N-substituted maleimide-based monomer may have excellent reactivity with other monomers upon copolymerization, thereby realizing uniform matting characteristics as well as high heat resistance.

In exemplary embodiments, the N-substituted maleimide-based monomer can be dissolved in the unsaturated nitrile-based monomer, and added to a dispersing medium. In this case, the N-substituted maleimide-based monomer may be included in an amount of about 1 to about 20% by weight, for example about 1 to about 5% by weight, based on the total weight of the mixture of monomers used to prepare the copolymer. In some embodiments, the N-substituted maleimide-based monomer may be included in an amount of about 1, 2, 3, 4, 5, 6, 7, 8, 9, 10, 11, 12, 13, 14, 15, 16, 17, 18, 19, or 20% by weight, based on the total weight of the mixture of monomers used to prepare the copolymer. Further, according to some embodiments, the amount of the N-substituted maleimide-based monomer can be in a range from about any of the foregoing amounts to about any other of the foregoing amounts.

Within this content range, the N-substituted maleimide-based monomer may be combined with other components to realize a synergistic effect of physical properties including temperature resistance.

The N-substituted maleimide-based monomer may exhibit uniform matting characteristics and/or high heat resistance with minimal or no degradation of impact resistance when a mixed weight ratio of the (C) above-described cross-linkable siloxane compound to the N-substituted maleimide-based monomer (D) is adjusted. The mixed weight ratio of the cross-linkable siloxane compound (C) to the N-substituted maleimide-based monomer (D) may be in a range of about 1:0.3 to about 1:3, for example about 1:0.5 to about 1:2.5. In some embodiments, the mixed weight ratio may be about 1:0.3, 1:0.4, 1:0.5, 1:0.6, 1:0.7, 1:0.8, 1:0.9, 1:1, 1:1.1, 1:1.2, 1:1.3, 1:1.4, 1:1.5, 1:1.6, 1:1.7, 1:1.8, 1:1.9, 1:2.0, 1:2.1, 1:2.2, 1:2.3, 1:2.4, 1:2.5, 1:2.6, 1:2.6, 1:2.7, 1:2.8, 1:2.9, or 1:3.0.

The copolymer according to one exemplary embodiment of the present invention may be prepared from a mixture further including at least one multifunctional vinyl-based monomer. Examples of the multifunctional vinyl-based monomer can include without limitation divinylbenzene, ethylene glycol di(meth)acrylate, allyl(meth)acrylate, diallylphthalate, diallylmalate, triallylisocyanurate, and the like, and mixtures thereof. In exemplary embodiments, the multifunctional vinyl-based monomer can include divinyl polydimethylsiloxane, vinyl-modified dimethylsiloxane, and/or a mixture thereof.

The multifunctional vinyl-based monomer may be used in an amount of about 0.001 to about 10 parts by weight, for example about 0.01 to about 3.0 parts by weight, based on a total of about 100 parts by weight of the mixture of monomers used to prepare the copolymer. In some embodiments, the multifunctional vinyl-based monomer may be used in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments, the amount of the multifunctional vinyl-based monomer can be in a range from about any of the foregoing amounts to about any other of the foregoing amounts.

Within this content range, a cross-linking degree and/or a polymerization reaction rate of the aromatic vinyl copolymer may be easily controlled, and the aromatic vinyl copolymer may be combined with other components to realize matting characteristics with minimal or no degradation of impact resistance and/or heat resistance.

In exemplary embodiments, the copolymer may be cross-linked. In this case, the cross-linking of the copolymer may be determined from the quantity of the insoluble content measured by a Soxhlet extraction method.

The Soxhlet extraction may be performed using an organic solvent selected from the group consisting of toluene, tetrahydrofuran, ethylacetate, chloroform, and mixtures thereof, but the present invention is not particularly limited thereto. In exemplary embodiments, tetrahydrofuran (THF) may be used for the Soxhlet extraction.

The Soxhlet extraction may be performed in a Soxhlet extraction reactor using a mixed solution obtained by mixing the copolymer according to one exemplary embodiment of the present invention with a solvent. FIG. 1 is a diagram showing a Soxhlet extraction reactor according to one exemplary embodiment of the present invention. Upon extraction, tetrahydrofuran 12 contained in a container 11 is heated and evaporated using a heater 13. The evaporated tetrahydrofuran is passed through an evaporation line 14, and supplied into a cooler 15 (including a cooling water inlet port 16 and a cooling water outlet port 17). The tetrahydrofuran cooled in the cooler is liquefied, and stored in a storage member included in a cylindrical filter 18. Thereafter, when the tetrahydrofuran is present at an excessive amount such that the tetrahydrofuran is emitted from the storage member through a circulation line 19 and flows in a container 11 through the circulation line 19, a resin is extracted into the circulating tetrahydrofuran through the cylindrical filter.

In exemplary embodiments, the copolymer can be subjected to Soxhlet extraction for 48 hours using tetrahydrofuran (THF). In this case, the insoluble content remaining after the extraction may be in a range of about 40 to about 75% by weight. In exemplary embodiments, the insoluble content may be in a range of about 43.0 to about 71.3% by weight. In some embodiments, the copolymer may have an insoluble content of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75% by weight. Further, according to some embodiments, the insoluble content can be in a range from about any of the foregoing amounts to about any other of the foregoing amounts.

Also, the copolymer according to exemplary embodiments may have a silicon content of about 0.30 to about 1.00% by weight, as measured by an X-ray fluorescence (XRF) spectrometer. In exemplary embodiments, the silicon content may be in a range of about 0.33 to about 0.65% by weight. In some embodiments, the copolymer may have a silicon content of about 0.30, 0.31, 0.32, 0.33, 0.34, 0.35, 0.36, 0.37, 0.38, 0.39, 0.40, 0.50, 0.60, 0.61, 0.62, 0.63, 0.64, 0.65, 0.66, 0.67, 0.68, 0.69, 0.70, 0.80, 0.90, or 1.00% by weight. Further, according to some embodiments, the silicon content can be in a range from about any of the foregoing amounts to about any other of the foregoing amounts.

In this case, the XRF analysis is fluorescent X-ray spectrometry, that is, a method in which X rays collide with a substance to analyze the wavelength distribution of X rays secondarily emitted from the substance so as to estimate types and composition ratios of component elements in the substance. A conventional apparatus may be used in this analysis. In the present invention, an X-ray fluorescence spectrometer (Model: Axios advanced. Maker: Panalytical (Netherland)) was used.

By way of example, a specimen using the aromatic vinyl copolymer according to one exemplary embodiment is manufactured in a method for analysis of silicon using XRF. Also, an analytical reference specimen is prepared. Silicon (Si) elements included in the reference specimen are measured using X-ray fluorescence (XRF) spectrometry, and a calibration curve of the silicon (Si) elements is plotted. Next, the silicon (Si) elements in the specimen may be measured using X-ray fluorescence (XRF) spectrometry, and subjected to quantitative analysis by applying the silicon (Si) elements to the previously plotted calibration curve.

The copolymer according to exemplary embodiments may have a glass transition temperature ($T_g$) of about 95 to about 115° C. Within this temperature range, a thermoplastic resin composition including the aromatic vinyl copolymer may exhibit excellent matting characteristics with minimal or no degradation of impact resistance and/or heat resistance. In some embodiments, the copolymer may have a glass transition temperature ($T_g$) of about 95, 96, 97, 98, 99, 100, 101, 102, 103, 104, 105, 106, 107, 108, 109, 110, 111, 112, 113, 114, or 115° C.

The copolymer may be prepared using a conventional polymerization method such as suspension polymerization, emulsion polymerization, solution polymerization, etc., but the present invention is not particularly limited thereto. In exemplary embodiments, suspension polymerization may be used as a method for preparing the copolymer. When the aromatic vinyl copolymer is prepared using a suspension polymerization method, an inorganic dispersing agent and/or an organic dispersing agent may be used to improve dispersibility. A homopolymer and/or a copolymer of acrylic acid and/or methacrylic acid may be used as the organic dispersing agent. When the copolymer is used as the organic dispersing agent, the content of the acrylic acid and/or methacrylic acid used may be greater than or equal to about 50 parts by weight, based on about 100 parts by weight of the copolymer. Also, the acrylic acid and/or methacrylic acid may be in the form of a salt of sodium, potassium and/or ammonium to maintain proper solubility.

In exemplary embodiments, azobisisobutyronitrile may be used as a polymerization initiator in the copolymerization used to make the copolymer, but the present invention is not particularly limited thereto.

The polymerization initiator may be used in an amount of about 0.01 to about 10 parts by weight, based on about 100 parts by weight of the mixture of monomers used to prepare the copolymer.

The copolymer may be used to realize matting characteristics of a thermoplastic resin composition. Thus exemplary embodiments further include a thermoplastic resin composition including the copolymer described herein and one or more thermoplastic resins.

Examples of the thermoplastic resin composition may include without limitation a styrene-acrylonitrile copolymer (SAN) resin composition, a methyl methacrylate-styrene-acrylonitrile copolymer (MSAN) resin composition, an acrylonitrile-butadiene-styrene copolymer (ABS) resin composition, a methyl methacrylate-acrylonitrile-butadiene-styrene copolymer (MABS) resin composition, an acrylonitrile-styrene-acrylate copolymer (ASA) resin composition, a polycarbonate (PC)/acrylonitrile-butadiene-styrene copolymer (ABS) alloy resin composition, a polycarbonate (PC)/acrylonitrile-styrene-acrylate copolymer (ASA) alloy resin composition, a polymethyl methacrylate (PMMA)/acrylonitrile-butadiene-styrene copolymer (ABS) alloy resin composition, a polymethyl methacrylate (PMMA)/methyl methacrylate-acrylonitrile-butadiene-styrene copolymer (MABS) alloy resin composition, a polymethyl methacrylate (PMMA)/acrylonitrile-styrene-acrylate copolymer (ASA) alloy resin composition, and the like, and mixtures thereof.

These resin compositions may be used alone or in combination and may be used in an amount of about 40 wt % to about 95 wt %, based on the total weight (100 wt %) of the thermoplastic resin composition.

The thermoplastic resin composition including the copolymer may exhibit excellent matting characteristics with minimal or no degradation of physical properties such as impact resistance, heat resistance, etc.

The present invention may provide a molded article including the thermoplastic resin composition including the copolymer. For example, the thermoplastic resin composition including the copolymer may be applied to various industry fields such as various electric and electronic products, automobile parts, and the like to provide a molded article.

The molded article according to one exemplary embodiment of the present invention may have a gloss of about 32% or less, as measured at an angle of 60° by an evaluation method according to ASTM D523, and may have a Vicat softening temperature (VST) of about 101 to about 110° C., as measured for a ¼ inch-thick specimen under conditions of a load of 5 kg and a rate of 50° C./hr by an evaluation method according to ISO 306B50. According to one exemplary embodiment, the molded article may have a gloss of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32%. According to one exemplary embodiment, the molded article may have a Vicat softening temperature of about 101, 102, 103, 104, 105, 106, 107, 108, 109, or 110° C.

Hereinafter, exemplary embodiments of the present invention will be described in further detail with reference to the following examples. However, it should be understood that the description set forth herein is not intended to limit the scope the present invention in any way.

Specifications of the respective components used in Examples and Comparative Examples are as follows.

(A) Styrene is used as an aromatic vinyl-based monomer.

(B) Acrylonitrile is used as an unsaturated nitrile-based monomer.

(C) 1,3,5,7-tetramethyl-1,3,5,7-tetravinyl-cyclotetrasiloxane (SKC Co., Ltd.; density: about 0.98 g/ml (20° C.), article name: Vinyl D-4, and molecular weight: 344.7 g/mol) is used as a cross-linkable siloxane compound.

(D) N-phenyl maleimide is used as an N-substituted maleimide-based monomer.

Example 1

0.2 parts by weight of t-dodecyl mercaptan (TDM), and 0.2 parts by weight of azobisisobutyronitrile (AIBN) is put into a reactor, based on the weight of a mixture of monomers including (A) styrene at 68.9% by weight, (B) acrylonitrile at 28.1% by weight, (C) 1,3,5,7-tetramethyl-1,3,5,7-tetravinyl-cyclotetrasiloxane at 2% by weight, and (D) N-phenyl maleimide at 1% by weight, and subjected to suspension polymerization to prepare a copolymer. The copolymer is washed with water, dehydrated, and then dried at 80° C. for 48 hours. Thereafter, the copolymer is extruded at a barrel temperature of about 250° C. using a twin-screw extruder equipped with a T-die to prepare a specimen for evaluating physical properties in the form of a sheet having a thickness of about 1 mm. The prepared copolymer has a weight average molecular weight of 170,000 g/mol, and a glass transition temperature of 109.5° C.

Example 2

A copolymer is prepared in the same manner as in Example 1, except that (A) styrene, (B) acrylonitrile, (C) 1,3,5,7-tetramethyl-1,3,5,7-tetravinyl-cyclotetrasiloxane, and (D) N-phenyl maleimide are used in amounts of 67.4% by weight, 27.6% by weight, 2% by weight, and 3% by weight, respectively. The prepared copolymer has a weight average molecular weight of 170,000 g/mol, and a glass transition temperature of 110.3° C.

Example 3

A copolymer is prepared in the same manner as in Example 1, except that (A) styrene, (B) acrylonitrile, (C) 1,3,5,7-tetramethyl-1,3,5,7-tetravinyl-cyclotetrasiloxane, and (D) N-phenyl maleimide are used in amounts of 66% by weight, 27% by weight, 2% by weight, and 5% by weight, respectively. The prepared copolymer has a weight average molecular weight of 170,000 g/mol, and a glass transition temperature of 112.3° C.

Example 4

A copolymer is prepared in the same manner as in Example 1, except that (A) styrene, (B) acrylonitrile, (C) 1,3,5,7-tetramethyl-1,3,5,7-tetravinyl-cyclotetrasiloxane, and (D) N-phenyl maleimide are used in amounts of 74% by weight, 23.5% by weight, 2% by weight, and 0.5% by weight, respectively. The prepared copolymer has a weight average molecular weight of 170,000 g/mol, and a glass transition temperature of 109.1° C.

Example 5

A copolymer is prepared in the same manner as in Example 1, except that (A) styrene, (B) acrylonitrile, (C) 1,3,5,7-tetramethyl-1,3,5,7-tetravinyl-cyclotetrasiloxane, and (D) N-phenyl maleimide are used in amounts of 70% by weight, 25% by weight, 1% by weight, and 4% by weight, respectively. The prepared copolymer has a weight average molecular weight of 170,000 g/mol, and a glass transition temperature of 110.1° C.

Comparative Example 1

A copolymer is prepared in the same manner as in Example 1, except that (A) styrene, (B) acrylonitrile, and (C) 1,3,5,7-tetramethyl-1,3,5,7-tetravinyl-cyclotetrasiloxane are used in amounts of 69.6% by weight, 28.4% by weight, and 2% by weight, respectively, without using (D) N-phenyl maleimide. The prepared copolymer has a weight average molecular weight of 170,000 g/mol, and a glass transition temperature of 108.4° C.

Comparative Example 2

A copolymer is prepared in the same manner as in Example 1, except that (A) styrene, (B) acrylonitrile, and (D) N-phenyl maleimide are used in amounts of 75.0% by weight, 24.0% by weight, and 1.0% by weight, respectively, without using (C) 1,3,5,7-tetramethyl-1,3,5,7-tetravinyl-cyclotetrasiloxane. The prepared copolymer has a weight average molecular weight of 170,000 g/mol, and a glass transition temperature of 107.5° C.

TABLE 1

|  | Examples | | | | | Comparative Examples | |
| --- | --- | --- | --- | --- | --- | --- | --- |
|  | 1 | 2 | 3 | 4 | 5 | 1 | 2 |
| SM | 68.9 | 67.4 | 66 | 74 | 70 | 69.6 | 75 |
| AN | 28.1 | 27.6 | 27 | 23.5 | 25 | 28.4 | 24 |
| Vinyl D-4 | 2 | 2 | 2 | 2 | 1 | 2 | — |
| N-PMI | 1 | 3 | 5 | 0.5 | 4 | — | 1 |
| $M_w$ | 170,000 | 170,000 | 170,000 | 170,000 | 170,000 | 170,000 | 170,000 |
| $T_g$ | 109.5 | 110.3 | 112.3 | 109.1 | 110.1 | 108.4 | 107.5 |

The glass transition temperatures ($T_g$) (units: ° C.) of the copolymers prepared in Examples 1 to 5 and Comparative Examples 1 and 2 are measured as follows: the copolymers are first heated to a temperature of 160° C. at a rate of 20° C./min using Q2910 commercially available from TA Instruments Co. Ltd., slowly cooled, maintained at an equilibrium state at 50° C., and heated to a temperature of 160° C. at a rate of 10° C./min. Then, an inflection point in the endothermic transition curve is determined as the glass transition temperature.

Example 6

0.1 parts by weight of a hindered phenol-based thermal stabilizer (BASF, article name: IRGANOX 1010) is added based on 100 parts by weight of a base resin, which includes 20% by weight of the copolymer prepared in Example 1, 29% by weight of a styrene-acrylonitrile copolymer (a copolymer with a weight average molecular weight of 100,000 g/mol prepared by subjecting 76% by weight of styrene and 24% by weight of acrylonitrile to a conventional suspension polymerization method), 28% by weight of an α-methylstyrene-styrene-acrylonitrile copolymer (a copolymer with a weight average molecular weight of 160,000 g/mol prepared by subjecting 54% by weight of α-methylstyrene, 17% by weight of styrene, and 29% by weight of acrylonitrile to a conventional suspension polymerization method), and 23% by weight of an acrylonitrile-butadiene-styrene graft copolymer (g-ABS) having a core-shell structure which includes a rubbery polymer at a content of 58% by weight and has an average particle size of 300 nm. Thereafter, the resulting mixture is melted, kneaded, and extruded to prepare a pellet.

In this case, the extrusion is performed at a barrel temperature of about 250° C. using a twin-screw extruder having a L/D ratio of 29 and a diameter of 45 mm, and the prepared pellet is dried at about 80° C. for about 2 hours, and then injection-molded at a cylinder temperature of about 230° C. in a 6 oz injection molding machine to prepare a specimen for evaluating physical properties. The Izod impact strength, Vicat softening temperature and gloss of the prepared specimen are measured. The measured results are listed in the following Table 2.

Example 7

A specimen is prepared in the same manner as in Example 6, except that 100 parts by weight of a base resin, which includes 10% by weight of the copolymer prepared in Example 2, 39% by weight of a styrene-acrylonitrile copolymer (a copolymer with a weight average molecular weight of 100,000 g/mol prepared by subjecting 76% by weight of styrene and 24% by weight of acrylonitrile to a conventional suspension polymerization method), 28% by weight of an α-methylstyrene-styrene-acrylonitrile copolymer (a copolymer with a weight average molecular weight of 160,000 g/mol prepared by subjecting 54% by weight of α-methylstyrene, 17% by weight of styrene, and 29% by weight of acrylonitrile to a conventional suspension polymerization method), and 23% by weight of an acrylonitrile-butadiene-styrene graft copolymer (g-ABS) having a core-shell structure which includes a rubbery polymer at a content of 58% by weight and has an average particle size of 300 nm, is used.

Example 8

A specimen is prepared in the same manner as in Example 6, except that the copolymer prepared in Example 2 is used instead of the copolymer prepared in Example 1.

Example 9

A specimen is prepared in the same manner as in Example 6, except that the copolymer prepared in Example 3 is used instead of the copolymer prepared in Example 1.

Example 10

A specimen is prepared in the same manner as in Example 6, except that the copolymer prepared in Example 4 is used instead of the copolymer prepared in Example 1.

Example 11

A specimen is prepared in the same manner as in Example 6, except that the copolymer prepared in Example 5 is used instead of the copolymer prepared in Example 1.

Comparative Example 3

A specimen is prepared in the same manner as in Example 6, except that the copolymer prepared in Comparative Example 1 is used instead of the copolymer prepared in Example 1.

Comparative Example 4

A specimen is prepared in the same manner as in Example 6, except that the copolymer prepared in Comparative Example 2 is used instead of the copolymer prepared in Example 1.

EVALUATION OF PHYSICAL PROPERTIES (1) Vicat softening temperature (VST) (units: ° C.) The Vicat softening temperature of a ¼ inch-thick specimen is measured under conditions of a load of 5 kg and a rate of 50° C./hr by an evaluation method according to ISO 306B50.

(2) Surface gloss (units: %) The surface gloss is measured at an angle of 60° by an evaluation method according to ASTM D523 using a BYK-Gardner gloss meter commercially available from BYK.

(3) Izod impact strength (units: kgf·cm/cm)

The Izod impact strength of a ⅛ inch-thick specimen is measured under notched conditions by an evaluation method according to ASTM D256.

TABLE 2

| Item | Copolymer (type/content) | SAN | α-SAN | g-ABS | Vicat softening temperature (° C.) | Gloss (%) | Izod impact strength (kgf · cm/cm) |
|---|---|---|---|---|---|---|---|
| Example 6 | Example 1/20 | 29 | 28 | 23 | 107.7 | 32 | 13.2 |
| Example 7 | Example 2/10 | 39 | 28 | 23 | 107.8 | 30 | 12.2 |
| Example 8 | Example 2/20 | 29 | 28 | 23 | 108.3 | 29 | 12.6 |
| Example 9 | Example 3/20 | 29 | 28 | 23 | 109.0 | 27 | 12.3 |
| Example 10 | Example 4/20 | 29 | 28 | 23 | 107.4 | 33 | 13.2 |
| Example 11 | Example 5/20 | 29 | 28 | 23 | 108.4 | 61 | 13.5 |
| Comparative Example 3 | Comparative Example 1/20 | 29 | 28 | 23 | 106.8 | 34 | 13.5 |
| Comparative Example 4 | Comparative Example 2/20 | 29 | 28 | 23 | 107.6 | 88 | 13.3 |

The specimens of Examples 6 to 9 which include the copolymers prepared in Examples 1 to 3 exhibit matting characteristics without degrading impact resistance strength, and also have remarkably improved heat resistance properties when the Vicat softening temperature reaches up to 109° C. The specimens of Examples 10 and 11 which include styrenic copolymers prepared in Examples 4 and 5 have a different mixed weight ratio of 1,3,5,7-tetramethyl-1,3,5,7-tetravinyl-cyclotetrasiloxane and N-phenyl maleimide, and have slightly degraded heat resistance properties or degraded matting characteristics, compared to the specimens of Examples 6 to 9. In contrast, the specimens of Comparative Examples 3 and 4 have degraded heat resistance properties when the specimens exhibit matting characteristics, or have degraded matting characteristics when the specimens exhibit heat resistance properties.

Although the present invention has been described in detail with reference to embodiments thereof, the embodiments of the present invention are provided to aid in understanding the present invention and not intended to limit the scope of the present invention. Therefore, it will be appreciated by those skilled in the art that various changes and modifications may be made in these embodiments without departing from the scope of the invention. The scope of the prevent invention is defined not by the detailed description, but by the claims and their equivalents, and all variations within the scope of the claims and their equivalents are to be construed as being included in the scope of the prevent invention.

What is claimed is:

1. A copolymer of a mixture of monomers comprising: (A) an aromatic vinyl monomer, (B) an unsaturated nitrile monomer, (C) a cross-linkable siloxane compound, (D) an N-substituted maleimide monomer, and at least one multifunctional vinyl monomer selected from the group consisting of divinylbenzene, ethylene glycol di(meth)acrylate, allyl(meth)acrylate, diallylphthalate, diallylmalate, and triallylisocyanurate, wherein the copolymer has a glass transition temperature ($T_g$) of about 95 to about 115° C., wherein a weight ratio of (C) the cross-linkable siloxane compound and (D) the N-substituted maleimide monomer is in a range of about 1:0.3 to about 1:3, and wherein a molded article comprising the copolymer has a gloss of about 32% or less, as measured at an angle of 60° by an evaluation method according to ASTM D523, and has a Vicat softening temperature (VST) of about 101 to about 110° C., as measured for a ¼ inch-thick specimen under conditions of a load of 5 kg and a rate of 50° C./hr by an evaluation method according to ISO 306B50.

2. The copolymer of claim 1, wherein the copolymer is prepared from the mixture comprising: (A) the aromatic vinyl monomer in an amount of about 55 to about 80% by weight, (B) the unsaturated nitrile monomer in an amount of about 15 to about 40% by weight, (C) the cross-linkable siloxane compound in an amount of about 0.1 to about 10% by weight, and (D) the N-substituted maleimide monomer in an amount of about 1 to about 20% by weight.

3. The copolymer of claim 1, wherein (C) the cross-linkable siloxane compound is represented by the following Formula 1:

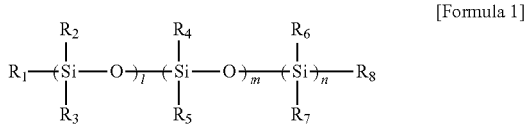

[Formula 1]

wherein l, m and n are the same or different and each is independently an integer ranging from 0 to 100, with the proviso that l, m and n are not zero at the same time, and $R_1$, $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$, $R_2$, $R_3$, $R_4$, $R_5$, $R_6$, $R_7$, and $R_8$ include a polymerizable unsaturated reactive group.

4. The copolymer of claim 1, wherein (C) the cross-linkable siloxane compound is represented by the following Formula 2:

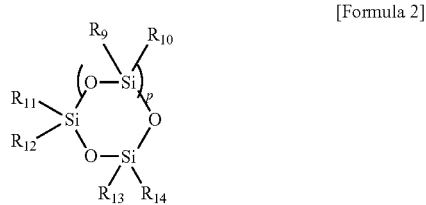

[Formula 2]

wherein $R_9$, $R_{10}$, $R_{11}$, $R_{12}$, $R_{13}$, and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$, $R_{10}$, $R_{11}$, $R_{12}$, $R_{13}$, and $R_{14}$ include a polymerizable unsaturated reactive group.

5. The copolymer of claim 1, wherein (C) the cross-linkable siloxane compound comprises 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane or a mixture thereof.

6. The copolymer of claim 1, wherein (C) the cross-linkable siloxane compound has a weight average molecular weight of about 150 to about 6,000 g/mol.

7. The copolymer of claim 1, wherein (A) the aromatic vinyl monomer comprises styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene or a mixture thereof.

8. The copolymer of claim 1, wherein (B) the unsaturated nitrile monomer comprises acrylonitrile, methacrylonitrile, ethacrylonitrile, phenylacrylonitrile, α-chloroacrylonitrile, fumaronitrile, or a mixture thereof.

9. The copolymer of claim 1, wherein (D) the N-substituted maleimide monomer comprises N-phenylmaleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, N-benzylmaleimide, or a mixture thereof.

10. The copolymer of claim 1, wherein the copolymer is cross-linked.

11. A thermoplastic resin composition comprising the copolymer defined in claim 1 and a thermoplastic resin that is not the same as the copolymer defined in claim 1.

12. The thermoplastic resin composition of claim 11, wherein the thermoplastic resin that is not the same as the copolymer defined in claim 1 comprises a styrene-acrylonitrile copolymer (SAN) resin, a methyl methacrylate-styrene-acrylonitrile copolymer (MSAN) resin, an acrylonitrile-butadiene-styrene copolymer (ABS) resin, a methyl methacrylate-acrylonitrile-butadiene-styrene copolymer (MABS) resin, an acrylonitrile-styrene-acrylate copolymer (ASA) resin, a polycarbonate (PC)/acrylonitrile-butadiene-styrene copolymer (ABS) alloy resin, a polycarbonate (PC)/acrylonitrile-styrene-acrylate copolymer (ASA) alloy resin, a polymethyl methacrylate (PMMA)/acrylonitrile-butadiene-styrene copolymer (ABS) alloy resin, a polymethyl methacrylate (PMMA)/methyl methacrylate-acrylonitrile-butadiene-styrene copolymer (MABS) alloy resin, a polymethyl methacrylate (PMMA)/acrylonitrile-styrene-acrylate copolymer (ASA) alloy resin, or a mixture thereof.

13. A molded article comprising the thermoplastic resin defined in claim 11.

14. The molded article of claim 11, wherein the molded article has a gloss of about 32% or less, as measured at an angle of 60° by an evaluation method according to ASTM D523, and has a Vicat softening temperature (VST) of about 101 to about 110° C., as measured for a ¼ inch-thick specimen under conditions of a load of 5 kg and a rate of 50° C./hr by an evaluation method according to ISO 306B50.

15. A copolymer consisting of units derived from (A) an aromatic vinyl monomer, (B) an unsaturated nitrile monomer, (C) a cross-linkable siloxane compound, (D) an N-substituted maleimide monomer, and optionally at least one multifunctional vinyl monomer selected from the group consisting of divinylbenzene, ethylene glycol di(meth)acrylate, allyl(meth)acrylate, diallylphthalate, diallylmalate, and triallylisocyanurate, wherein the copolymer has a glass transition temperature ($T_g$) of about 95 to about 115° C., wherein a weight ratio of (C) the cross-linkable siloxane compound and (D) the N-substituted maleimide monomer is in a range of about 1:0.3 to about 1:3, and wherein a molded article comprising the copolymer has a gloss of about 32% or less, as measured at an angle of 60° by an evaluation method according to ASTM D523, and has a Vicat softening temperature (VST) of about 101 to about 110° C., as measured for a ¼ inch-thick specimen under conditions of a load of 5 kg and a rate of 50° C./hr by an evaluation method according to ISO 306B50.

* * * * *